Feb. 4, 1958 E. E. TANGARD 2,822,109
CLOSURE FOR PRESSURE VESSELS
Filed July 13, 1954 4 Sheets-Sheet 2
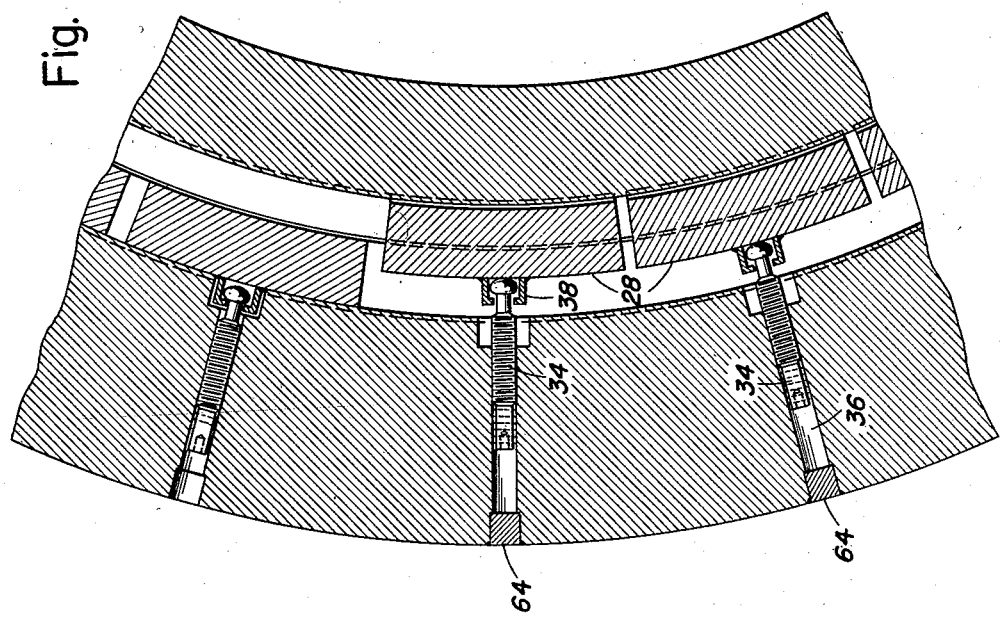
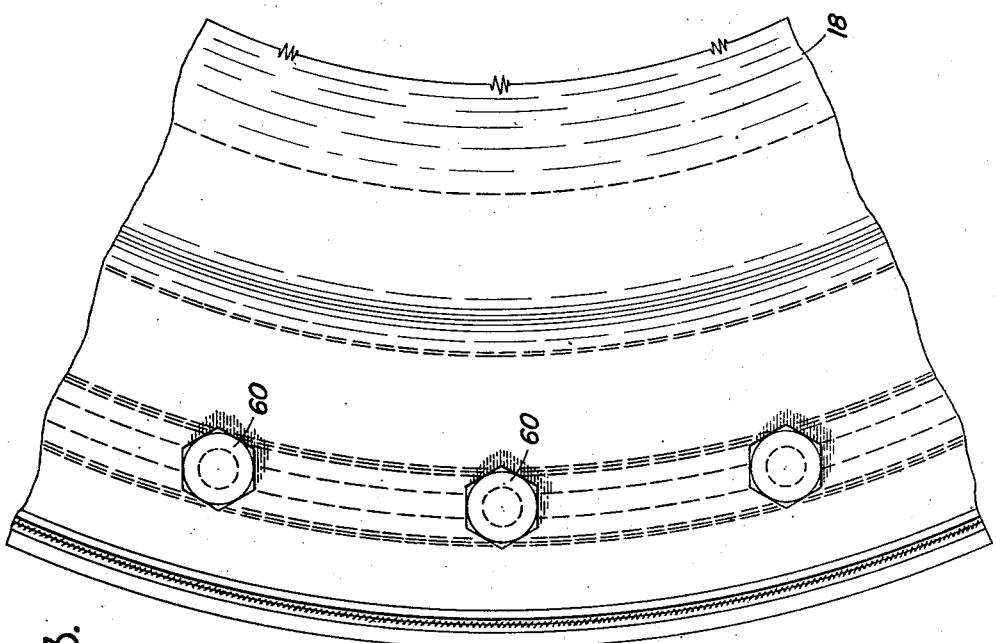
INVENTOR
Einar E. Tangard
BY
ATTORNEY Feb. 4, 1958  E. E. TANGARD  2,822,109
CLOSURE FOR PRESSURE VESSELS
Filed July 13, 1954  4 Sheets-Sheet 3

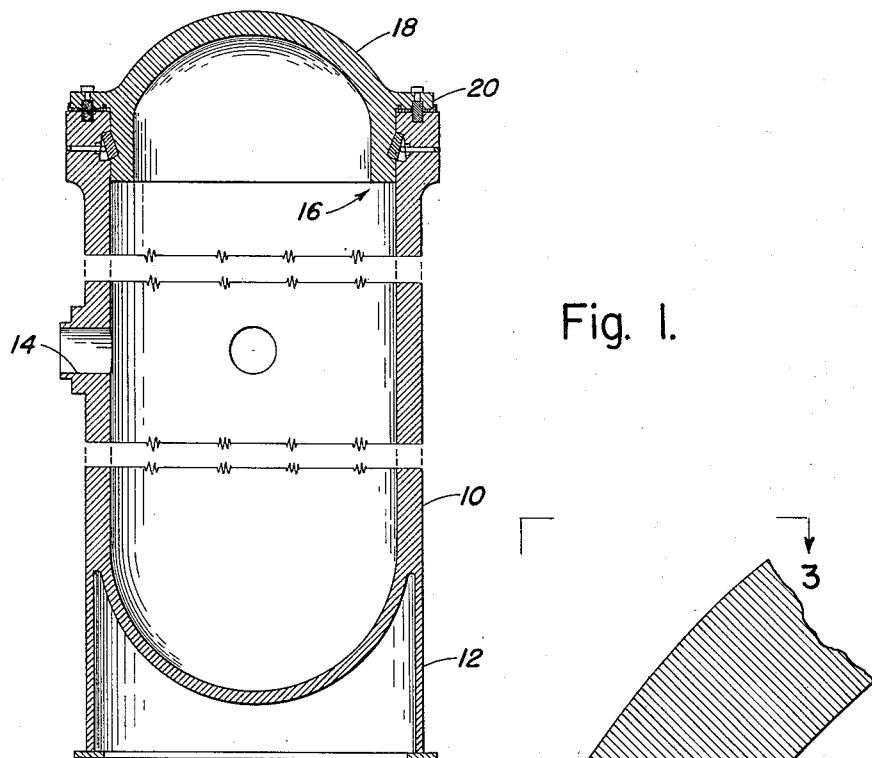
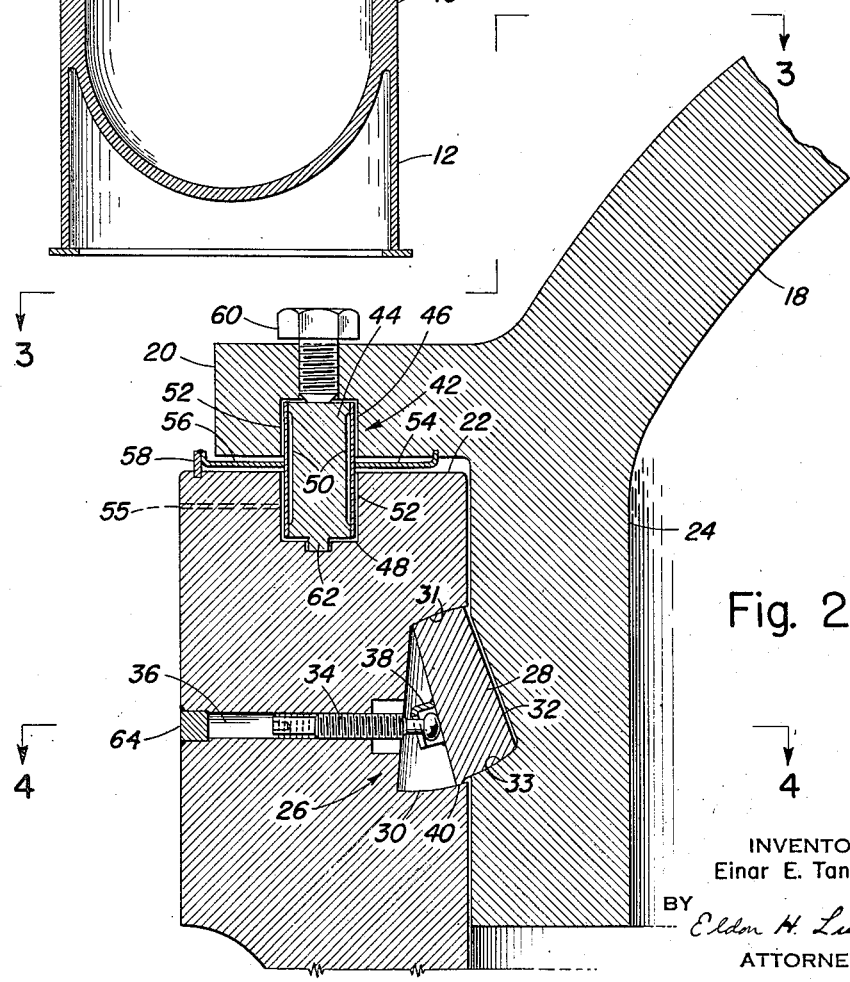

INVENTOR
Einar E. Tangard
BY
Eldon H. Luther
ATTORNEY

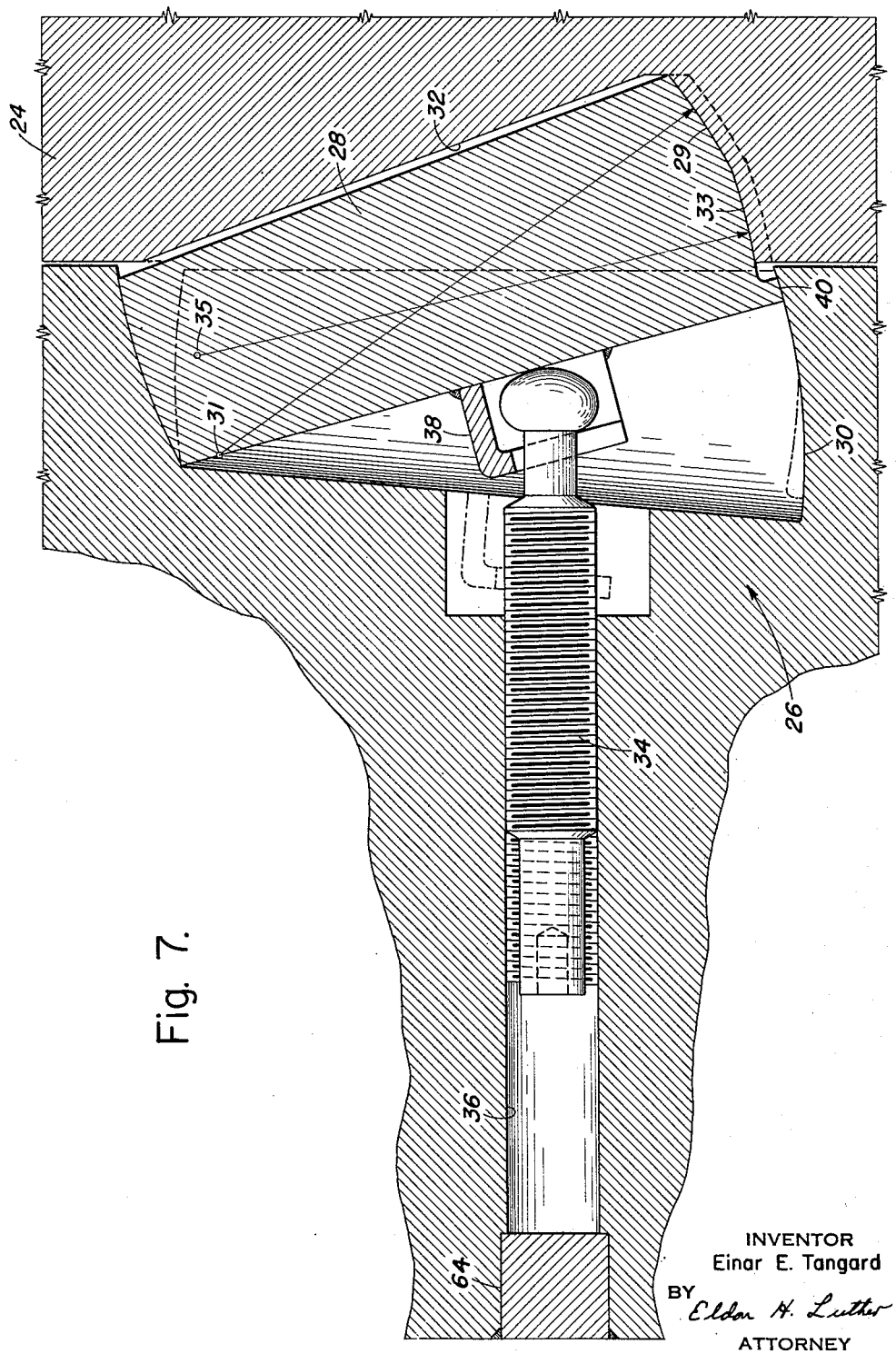

United States Patent Office 2,822,109
Patented Feb. 4, 1958

2,822,109

CLOSURE FOR PRESSURE VESSELS

Einar E. Tangard, Scarsdale, N. Y., assignor to Combustion Engineering, Inc., New York, N. Y., a corporation of Delaware Application July 13, 1954, Serial No. 442,963

10 Claims. (Cl. 220—46)

This invention relates to pressure vessels provided with removable closures and particularly to vessels of large diameter subjected to very high internal pressures and having a relatively large closure or closures connected thereto in a fluid tight manner capable of withstanding these high internal pressures yet capable of being readily removed to permit access to the interior of the vessels.

In certain industrial processes large vessels are employed and are operated under very high internal pressures, as for example, 2000 pounds and higher per square inch. It is often required that access openings be provided in these vessels which permit the insertion and removal of very large equipment necessitating the diameter of these openings being approximately equal to the internal diameter of the vessel. With these very high internal pressures and large diameters it will be appreciated that a very large force is applied to the closures for the access openings rendering the problem of positively securing the closures within these openings in a fluid tight manner a difficult one.

It is an object of this invention to provide such a pressure vessel with a closure secured within an opening in the vessel in a manner which positively retains the closure within the opening against the large force developed by high pressure within the vessel and which prevents fluid leakage past the closure but which permits the closure to be readily removed from said opening when desired.

Other and further objects of the invention will become apparent to those skilled in the art as the description proceeds.

With the aforementioned objects in view, the invention comprises an arrangement construction and combination of the elements of the inventive organization in such a manner as to attain the results desired as hereinafter more particularly set forth in the following detailed description of an illustrative embodiment, said embodiment being shown by the accompanying drawings wherein:

Figure 1 is a vertical sectional view of a pressure vessel embodying the present invention.

Figure 2 is a detailed fragmentary vertical section of the juncture of the closure and vessel showing in detail the mechanism for retaining the closure within the vessel and the fluid tight seal means interconnecting the closure and vessel.

Figure 3 is a fragmentary plan view taken generally from line 3—3 of Figure 2.

Figure 4 is a fragmentary transverse sectional view taken along line 4—4 of Figure 2 and showing further details of the mechanism for retaining the closure within the vessel.

Figure 7 is an enlarged vertical transverse sectional view of one of the locking segments shown in its locked position.

Figure 5:
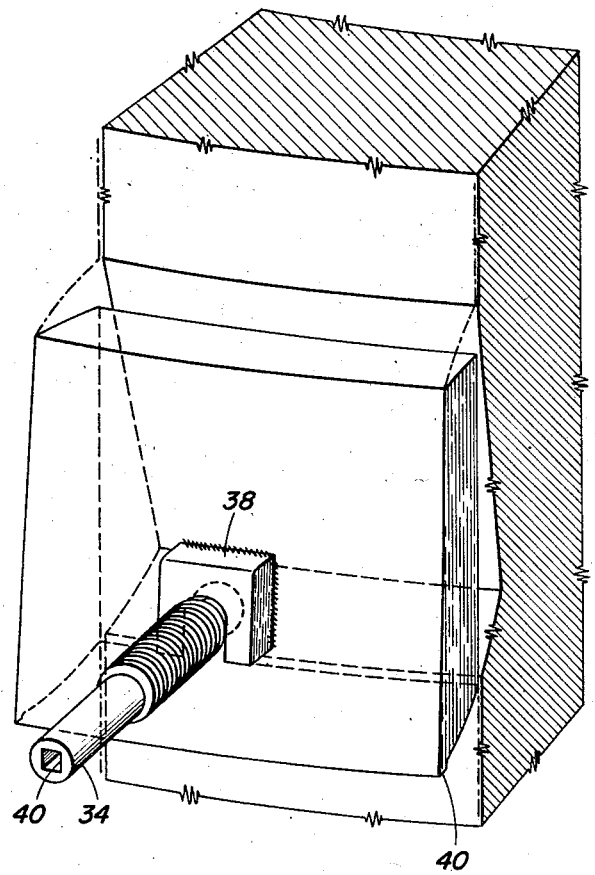
Figure 5 is a detailed view of one of the locking segments together with the screw threaded actuator therefore.

Referring now in detail to the drawings, wherein like reference characters are used throughout to designate like elements, the organization of Figure 1 comprises a pressure vessel 10 which is illustratively disclosed in the general form of a vertical cylinder supported upon skirt 12. This vessel is of large diameter and has its upper end open at 16 permitting the insertion and removal of large equipment. In the illustrated vessel, relatively small radial openings 14 may be provided in the vertical wall in order to permit the attachment of piping and/or various actuating mechanism to the vessel and instrumentation of the vessel with these openings normally being sealed in a fluid tight manner by means not disclosed herein.

Received within opening 16 in the upper end of the vessel is the closure 18 which includes the radial outward extending flange 20 disposed above the upper face 22 of the vessel wall and which also includes the downward extending cylindrical skirt 24 which has its peripheral surface juxtaposed to the inner surface of the vessel wall.

The closure is locked within opening 16 against the outwardly acting force produced by a high pressure within the vessel by means of the locking mechanism designated generally 26 (Fig. 2), and which includes the movable locking sectors or segments 28 pivotally disposed or received within the annular recess 30 provided in the inner surface of the vessel wall with the lower end of the segments being movable from their outermost or unlocked position where the segments are contained entirely within recess 30 to their innermost or locked position wherein most of the lower end of each of the segments is positioned within the annular recess 32 formed in the peripheral surface of skirt 24 with the segments then being interposed between the downwardly disposed face in the form of shoulder 31 of recess 30 and the upwardly disposed face or shoulder 33 of recess 32 (this locked position of the sector being shown in Fig. 2). To prevent radial movement of the upper end of the sectors and provide for pivotal movement of the sectors about their upper ends recess 32 is of generally triangular transverse section.

As shown in the enlarged view of Figure 7 the lower surface of the segments 28 is not a smooth curve formed by swinging an arc from a single center but is formed by swinging two arcs from different centers with the arcs intersecting generally in the center of this surface. The arc identified as 29 is swung from the center 31 while the arc 33 is swung from center 35. The lower surface of annular recess 32 is similarly formed so that when segments 28 are in their radially inner or locked position and closure 18 is moved from its lower position, indicated in dotted lines in Figure 7, to its upper or raised position in engagement with the segments, the segments are effectively locked in this recess and due to the particular configuration of these surfaces cannot be moved radially outward.

As shown in Figure 4 these pivotally movable locking sectors are circumferentially disposed in closely spaced side by side relation throughout the circumferential length of annular recess 30 and as illustratively disclosed the pivotal movement of these members is effected by the screw threaded actuator 34 which is threadedly received within radial bore 36 provided in the vessel wall. A separate actuator is provided for each sector and is connected to the sector in a manner permitting universal movement between the actuator and the sector with this connection including an enlarged head provided on the inner end of actuator 34 and received within slotted bracket 38 in the manner disclosed. Rotation of actuator 34 is had by means of a suitable tool, not shown, which is received in the polygonal recess 40 provided in the outer end of the actuator.

In order to provide for free pivotal movement of the locking sectors to and from their withdrawn or unlocked position where they are of course entirely contained within annular recess 30 and their locked positions where their lower end is partially contained in recess 32 the lower surface of the locking sectors is provided with lip 40 (Figs. 2 and 5), which engages and slides upon the lower surface of recess 30 reducing the surface contact between the sector and the lower face of the recess and preventing binding of the locking sectors in this recess.

Fluid leakage from within vessel 10 past closure 18 is prevented by the seal member 42 which includes an annular metallic core 44 received intermediate complementary recesses 46 and 48 formed in flange 20 of closure 18 and end face 22 of the vessel, respectively. The inner and outer radial faces or surfaces of core 44 are relieved at 50 intermediate their axial extremities and are provided with flexible metallic facings 52 which bridge the relieved portions 50 and are secured in a fluid tight manner to the core by welding at their axial extremities. Extending radially inward from inner facing 50 and outward from outer facing 50 are the flexible metallic rings 54 and 56, respectively, with the inner edge of ring 54 being welded to the lower surface of flange 20 and the outer edge of ring 56 being welded to the upstanding annular member 58 which is in turn welded to the upper surface 22 of vessel 10 in the manner shown with all of these welds being fluid tight.

The core 44 is forced into fluid tight engagement with the lower end or base of recess 48 by the set screws 60 which are threadedly received within flange 20 and have their lower end bearing against upper surface of the core so that upon threading the set screws into the flange 20 core 44 is forced downwardly into recess 48 with the annular projection 62 provided on the core forming a fluid tight juncture with the base of this recess. Rather than having metal to metal contact between core 44 and recess 48 a gasket may be interposed between the two if desired.

The threading of set screws 60 into flange 20 also moves closure 18 up from its lower position, indicated in dotted lines in Figure 7, where the segments 28 may be moved to and from their locked and unlocked position to its upper position where the segments are firmly secured between the downwardly facing surface of recess 30 and the upwardly facing surface of recess 32 and where the segments are prevented from moving radially. In operation, after the necessary mechanism has been inserted into vessel 10 through opening 16 and it is desired to seal this opening against fluid leakage from within, the vessel closure 18 is positioned within the opening. Prior to such positioning of the closure, however, each of the locking sectors 28 is moved to its outermost or unlocked position by threading actuator 34 radially outward of the bore 36 and seal member 42 is secured to flange 20 by welding the inner edge of metallic ring 54 to the under surface of this flange. After the closure has been thus prepared it is inserted into opening 16 and actuators 34 are threaded radially inward to their innermost positions causing the locking sectors to pivot about their upper end with their lower end being received in recess 32 formed in the peripheral surface of skirt 24 of closure 18. Bores 36 are then sealed against fluid leakage by welding the seal plugs 64 into the outer ends of bores in a fluid tight manner. Set screws 60 are then tightened down causing closure 18 to move from its lower to its upper position and causing core 44 to be forced into fluid tight engagement with the base of recess 48 which may or may not contain a gasket. The outer edge of metallic ring 56 is then welded to the annular member 58. To remove the closure after it has been thus inserted the weld joining member 58 and ring 56 is broken and set screws 60 are released. Seal plugs 64 are then removed and sectors 28 are withdrawn to their outermost position by threading actuators 34 radially outward of bores 36. Thereafter closure 18 may be removed outwardly from opening 16.

Because of the particular construction of seal means 42 limited relative movement may be had between closure 18 and the wall of vessel 10 both axially and radially. This movement may occur because of deformation of the metal of the sectors, closure or vessel due to compression or shear forces set up as a result of a high internal pressure within the vessel. This accommodation of relative movement is due to facings 52 provided on core 44 and the metallic rings 54 and 56. The facings permit limited radial movement between the closure and the vessel wall while the metallic rings permit limited axial movement.

By positioning rings 56 and 54 intermediate flange 20 and the surface 22 on the upper end of the vessel wall fluid pressure which is exerted against the under surface of ring 54 and may be exerted on the under surface of ring 56 will force these rings into engagement with the lower surface of flange 20 which will act as a back up member for these rings relieving them of the large force which they otherwise would have to withstand. Similarly the facings 52 of core 44 will be forced against the core and thus be relieved of a large portion of the force which they would otherwise have to be designed for and withstand.

Figure 6:
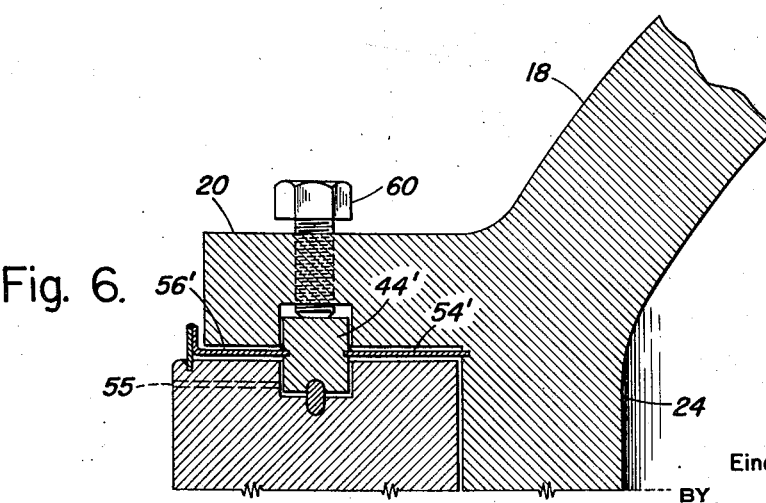
Figure 6 is a view generally similar to Figure 2 but showing a modified form of seal means interconnecting the closure and vessel.

The embodiment of Figure 6 is similar to that of Figure 2 except that core member 44' of this modified embodiment is not provided with relieved portions and metallic facings extending thereover but rather has the rings 54' and 56' welded directly thereto. Thus this modified construction allows movement between the vessel and the closure only in an axial direction rather than both in an axial and a radial direction. Also in the Figure 6 embodiment, a gasket 66 is interposed between the core member 44 and the annular recess 48.

The seal provided by metallic ring 56 is only an auxiliary or secondary seal to that provided by the combination of metallic ring 54 and core member 44 and is effective only in the event that there is leakage between the lower end of core 44 and the base or bottom of recess 46. Should such a leakage occur, however, detection thereof is had through suitable mechanism, not disclosed, connected to the monitoring passage 55 with this detecting device also being effective to act as a pressure regulator bleeding what may be a lethal fluid into a remote safe place and insuring that the pressure exerted against the lower surface of ring 56 does not exceed a predetermined value which is lower than the pressure within the vessel 10 so that the auxiliary seal 56 does not have to withstand the full pressure within the vessel. For safety purposes, however, it may be well to construct this seal to withstand this full pressure.

With the organization of the present invention it will be apparent that a relatively simple yet highly effective structural arrangement is provided whereby a large closure is retained within an opening of a pressure vessel in a fluid tight manner in opposition to a relatively large force created by the high internal pressure in the vessel and yet when desired this closure may readily be removed from said opening.

While in the illustrative organization disclosed, the closure is provided on the upper end of the vessel, the vessel may equally well be arranged with the closure on the bottom or on both the top and bottom and the vessel may be spherical rather than cylindrical as disclosed.

While I have illustrated and described a preferred embodiment of my novel organization it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. A cylindrical vessel having an open end, a closure for said open end including a portion extending thereinto with its peripheral surface juxtaposed to the inner surface of said vessel, said juxtaposed surfaces provided with cooperating annular relieved portions having a locking ring means associated therewith with the annular relieved portion in the vessel being of sufficient size to receive the locking ring means wholly therewithin and the annular relieved portion in the peripheral surface of the closure being of sufficient size to receive the axially inner end of said ring means and with the axially outer surface of the relieved portion in the vessel and the axially inner surface of the relieved portion in the closure being opposed for reception of the locking ring means therebetween, said locking ring means comprising individual arcuate segments in side by side relation mounted within the annular relieved portion in the vessel for pivotal movement about their axially outer ends so that their axially inner ends move radially to and from a position where they are wholly within the relieved portion in the vessel and a position whereby they are interposed between the axially outer surface of the relieved portion in the vessel and the axially inner surface of the relieved portion in the closure, individual means connected to each segment for effecting the generally radial pivotal movement of their axially inner ends, and means for effecting a fluid tight seal between the closure and the vessel.

2. The organization defined in claim 1 wherein the individual actuators comprise members threadedly received in radial bores provided in the vessel wall with the outer end of said bores having a seal plug received therewithin.

3. In an organization of the type described, a pressure vessel having an open end, a closure for said end including a radial flange overlying the end of the vessel in closely spaced relation thereto when said closure is in its closed position, adjustable means operative in one position to positively retain said closure in its closed position and in another position to permit removal of said closure from its closed position, means sealing the juncture of the closure and vessel in a fluid tight manner comprising an annular member received in complementary annuluses formed in the closely spaced surfaces of the flange and the end of the vessel, said annular member including a metallic inner core having its inwardly disposed radial surface relieved intermediate its axial extremities and provided with a flexible metallic annular facing bridging said relieved portion and secured at its axial extremities to said core in a fluid tight manner, a flexible metallic ring secured to said facing intermediate its extremities and extending radially inward intermediate said closely spaced surfaces, the radially innner edge of said ring being secured to said closure in a fluid tight manner, numerous adjustable actuators uniformly distributed circumferentially of the annular member and operative to act against said annular member to exert an adjustable force thereagainst forcing said annular member toward the root of the annulus formed in the end of the vessel.

4. The organization defined in claim 3 wherein the outwardly disposed radial surface of the core is also relieved intermediate its axial extremities and is provided with a flexible metallic annular facing bridging said relieved portion and secured at its axial extremities to said core in a fluid tight manner and wherein a flexible metallic ring is secured to said facing in a fluid tight manner intermediate the extremities thereof and extends radially outward therefrom intermediate said closely spaced surfaces, said ring being effectively secured at its outer edge to said vessel in a fluid tight manner.

5. A cylinder vessel having an open end, a closure for said open end including a portion extending thereinto with its peripheral surface juxtaposed to the inner surface of said vessel, said juxtaposed surfaces provided with co-operating annular relieved portions having a locking ring means associated therewith with the annular relieved portion in the vessel being of sufficient size to receive the locking ring means wholly therewithin and the annular relieved portion in the peripheral surface of the closure being of sufficient size to receive the axially inner end of said ring means and with the axially outer surface of the relieved portion in the vessel and the axially inner surface of the relieved portion in the closure being opposed for reception of the locking ring means therebetween, said locking ring means comprising individual arcuate segments in side by side relation mounted within the annular relieved portion in the vessel for pivotal movement about their axially outer ends so that their axially inner ends move radially to and from a position where they are wholly within the relieved portion in the vessel and a position where they are interposed between the axially outer surface of the relieved portion in the vessel and the axially inner surface of the relieved portion in the closure, the axially inner surface of segments and the relieved portion in the closure being formed so as to prevent radial movement of the axially inner end of said segments when said surfaces are in engagement, individual means connected to each segment for effecting the generally radial movement of their axially inner ends, and means for effecting a fluid tight seal between the closure and the vessel.

6. A pressure vessel having an opening therein, a removable closure for said opening including a portion that extends into said opening when the closure is in its closed position with the outer wall of said portion being juxtaposed to the inner wall of said opening, said walls having opposed shoulders formed thereon and spaced axially of said opening and closure, movable means effective when in one position to prevent removal of the closure from the opening and in another position to permit such removal said means including individual unitary locking members of a length slightly less than the axial spacing of said shoulders when the closure is in position in said opening, said members being disposed in side by side relation with one end disposed adjacent one of said shoulders and tiltably mounted about said one end for movement to and from a position intermediate said shoulders for engagement therewith to prevent removal of the closure, means operative to effect such tilting movement and means providing a fluid tight seal between said closure and said vessel.

7. A cylindrical vessel having an open end, a removable closure for said open end including a portion that extends thereinto when the closure is in its closed position with the periphery of said portion then being juxtaposed to the inner wall of said open end, said juxtaposed surfaces having radially opposed complementary relieved portions forming axially spaced opposed surfaces, locking ring means housed within one of said relieved portions and comprised of individual arcuate segments in side by side relation, said segments having an axial dimension slightly less than the axial spacing of said opposed surfaces and being mounted for tilting movement about one of their ends to and from a position intermediate said opposed surfaces where they effectively lock the closure within the open end of the vessel, means operative to effect said tilting movement, and means providing a fluid tight seal between said closure and said vessel.

8. In a pressure vessel having an opening of circular transverse section provided in a wall thereof, the combination of a removable closure adapted to be removably disposed in said opening in a fluid tight manner and having a portion disposed within said opening when occupying its closed position with the peripheral surface of said portion being juxtaposed to the inner wall surface of said opening, an annular relieved portion of generally triangular transverse section provided in one of said surfaces and forming an annular generally radially disposed shoulder, the other surface having a shoulder formed thereon in opposed relation to the first mentioned shoulder and axially spaced therefrom a distance substantially equal to the axial dimension of said annular relieved portion, a plurality of individual segments disposed in side by side relation to form a ring, said segments having one end juxtaposed to the second mentioned shoulder and being mounted for pivotal movement generally about said one end so that the other end moves generally radially to and from a position where the segments are interposed between said first mentioned shoulder and said second mentioned shoulder thereby preventing removal of the closure from the circular opening and a position where said segments are radially removed from said annulus thereby permitting such removal, means operative to effect such pivotal movement of said segments, and means providing a fluid tight seal between said closure and said vessel when the closure is disposed within said opening.

9. The organization defined by claim 8 wherein the ends of the segments that coact with the first mentioned shoulder and said first mentioned shoulder are angularly disposed so as to prevent radial movement of said end when said ends and said first mentioned shoulder are in engagement.

10. In combination, a pressure vessel having an opening therein of circular transverse section, a closure for said opening including a portion positionable within said opening and presenting a peripheral surface in juxtaposition to the inner surface of the opening, the inner surface of said opening having an inwardly facing generally radially disposed annular shoulder, the peripheral surface of the closure having an outwardly facing generally radially disposed annular shoulder complementary to the shoulder formed on the opening wall and disposed axially inward of said opening when said closure is in place within the opening, means for securing the closure within the opening against the force created by a superatmospheric pressure within the vessel comprising a plurality of individual arcuate segments disposed in side by side relation so as to collectively form a ring coaxial with the closure, said segments having a length slightly less than the distance between said shoulders when the closure is in place in the opening being disposed with one end adjacent one of said shoulders and mounted for pivotal movement about said one end to and from a position where they are intermediate said shoulders with their opposite ends engaging the spaced shoulders and thereby effectively retaining the closure within the vessel and a position where they are entirely free of the other of said shoulders and thereby permit the closure to be removed from the opening, means for effecting this pivotal movement of said segments and means providing a fluid tight seal between the vessel and the closure when the latter is in place within the opening.

References Cited in the file of this patent

UNITED STATES PATENTS

| | | |
|---|---|---|
| 1,958,273 | Hutt | May 8, 1934 |
| 2,192,328 | Price | Mar. 5, 1940 |
| 2,252,488 | Bierend | Aug. 12, 1941 |
| 2,298,511 | Rathbun | Oct. 13, 1942 |
| 2,352,583 | Zetterquist | June 27, 1944 |

FOREIGN PATENTS

| | | |
|---|---|---|
| 490,788 | Germany | Feb. 10, 1930 |